United States Patent
Gibbons et al.

[19]

[11] Patent Number: 6,077,000
[45] Date of Patent: Jun. 20, 2000

[54] PIPEWORK TEMPLATE

[75] Inventors: Kevin Norman White Gibbons, Horsham; Tom Spalding, Kingston-on-Thames, both of United Kingdom

[73] Assignee: Aqualisa Products Limited, United Kingdom

[21] Appl. No.: 08/805,855

[22] Filed: Mar. 3, 1997

[51] Int. Cl.[7] .................................................. B23B 49/02
[52] U.S. Cl. ....................... 408/72 B; 33/529; 33/563; 33/613; 33/645; 408/72 R
[58] Field of Search ................. 408/72 R, 72 B, 408/97; 33/562, 563, 529, 645, 613, 533

[56] References Cited

U.S. PATENT DOCUMENTS

| | | | |
|---|---|---|---|
| 2,825,143 | 3/1958 | Ploivka | 408/72 R |
| 2,920,509 | 1/1960 | Bennett | 408/72 R |
| 4,057,898 | 11/1977 | Piosky . | |
| 4,199,060 | 4/1980 | Howard . | |
| 4,952,101 | 8/1990 | Coombs | 408/72 B |
| 5,056,966 | 10/1991 | Lee | 408/72 R |
| 5,064,319 | 11/1991 | Ericksen | 408/72 R |
| 5,116,170 | 5/1992 | Palmer et al. . | |
| 5,375,949 | 12/1994 | McHenry, Jr. | 408/72 B |
| 5,383,281 | 1/1995 | Monger . | |
| 5,392,524 | 2/1995 | Hill | 33/654 |
| 5,569,001 | 10/1996 | Brutscher et al. | 408/72 R |
| 5,666,737 | 9/1997 | Ryan, III | 33/562 |

FOREIGN PATENT DOCUMENTS

| | | |
|---|---|---|
| 0 219 428 A1 | 4/1987 | European Pat. Off. . |
| 1481168 | 5/1967 | France . |
| 31 46 007 A1 | 5/1983 | Germany . |
| 86 32 306 | 4/1987 | Germany . |
| 38 15 772 A1 | 11/1989 | Germany . |
| 40 01 174 A1 | 8/1990 | Germany . |
| 43 39 351 A1 | 5/1995 | Germany . |
| 2 097 943 | 11/1982 | United Kingdom . |
| 2215261 | 9/1989 | United Kingdom . |
| 2229391 | 9/1990 | United Kingdom . |
| 2231306 | 11/1990 | United Kingdom . |
| WO 94/16171 | 7/1994 | WIPO . |

OTHER PUBLICATIONS

EPO Search Report dated Nov. 26, 1997 (3 pages).

*Primary Examiner*—Steven C. Bishop
*Attorney, Agent, or Firm*—Harness, Dickey & Pierce, P.L.C.

[57] ABSTRACT

A template 20 with which pipework may be correctly positioned in a wall for connection to a wall mounted unit, the template comprising first apertures 24 for guiding drills at desired positions of pipes in the wall, and second apertures 22 for screwing the template to a wall, wherein the second apertures 22 are spaced and dimensioned such that the wall mounted unit may be mounted on the wall using the screw holes created by the second apertures 22 and be correctly aligned with pipework positioned according to the first apertures 24, each of the first apertures 24 may comprise a centrally mounted annular member 28 defining an aperture through which a center hole may be drilled.

12 Claims, 10 Drawing Sheets

PIPEWORK TEMPLATE

BACKGROUND OF THE INVENTION

The present invention relates to a template, more particularly to a template which may be used to position pipework in a wall correctly for attachment to a wall mounted unit such as a shower mixing unit or a gas water boiler.

Previously, in other fields of technology, various types of template have been proposed.

GB-A-2231306 discloses a template for use in cutting out a letter box opening. The template comprises a flat metal plate having a rectangular opening corresponding to the dimensions of the letter box opening, two locating pins extending from one face of the plate and two guide holes corresponding to the two locating pins. The guide holes are used to drill holes in a door and then the template is mounted on the door by inserting the locating pins into the holes in the door. The template may then be secured to the door by screws extending from the other side of the door into the locating pins. With the template so secured, the rectangular opening may be used to guide a tool in cutting the letter box opening.

GB-A-2229391 discloses a channel section template which fits over the edge of a door. In its base, an aperture is provided for marking or cutting out a recess required for a door lock and, in its sides, holes are provided for marking or cutting holes in the door for other elements of the lock. This device is retained firmly on the edge of the door by means of the two opposing side walls which grip opposite faces of the door.

Previously, for positioning pipework in walls, there have been provided paper or cardboard templates. Where units such as shower mixing units, radiators, boilers, etc are to be mounted on a wall, the templates are often supplied as part of the instructions or packaging of the units. Such templates are cut or removed from the instructions or packaging and held against the wall, possibly by means of masking tape and such like. The templates provide markings which can be transferred to the wall such that holes for pipework and mounting screws can be drilled in the wall at the correct positions for the corresponding wall mounted unit.

These previous templates are not straightforward to use. It is difficult to transfer the markings to the wall accurately, particularly while ensuring that the template maintains its correct orientation. Furthermore, once the wall is marked, correct positioning of the various mounting holes and pipework holes is limited by the skill of the person drilling the holes.

Whilst drilling small, screw holes with sufficient accuracy may be relatively easy, drilling larger holes, for instance for pipes, can be more difficult as larger drill bits have a tendency to move from where they are intended to drill.

Neither the template of GB-A-2231306, nor that of GB-A-2229391 provides any suitable alternative, since both templates require access to both sides of the member on which they are to be mounted. On the one hand, GB-A-2231306 requires screws to be attached to the locating pins from an opposite face of the member and, on the other hand, GB-A-2229391 requires the template to be clipped around the edge of the member. Furthermore, neither of these documents describes templates for large circular apertures, but only rectangular apertures which are sufficiently large for a tool to be inserted and guided along individual edges of the template aperture.

Another problem, associated particularly with pipes extending from walls where they are to be inserted into units such as shower wall units, is to make them the correct length. Measuring and cutting lengths by hand can be acceptable, but can lead to shoddy workmanship. The connecting units may need to be designed to accept greater tolerances, for instance in the straightness of cut or length of pipe.

SUMMARY OF THE INVENTION

It is an aim of the present invention to provide a template for positioning pipework and a method which uses that template, which avoid or at least alleviate some or all of the above problems and disadvantages.

According to a first aspect of the present invention there is provided a template for use in correctly positioning one or more pipes of pipework relative to a surface-mounted unit for installing said surface-mounted unit onto a mounting surface, the template comprising:

one or more first apertures each for guiding a drill at a desired position of a or the pipe in said mounting surface; and second apertures for use in screwing the template to said mounting surface; wherein the second apertures are spaced and dimensioned such that the surface-mounted unit may be mounted on the mounting surface using screw holes at positions corresponding to the second apertures and be correctly aligned with pipework positioned according to the one or more first apertures.

According to a second aspect of the present invention, there is a template for use in correctly positioning one or more pipes of pipework relative to a surface-mounted unit for installing said surface-mounted unit onto a mounting surface, said template including:

one or more substantially circular first apertures, with an annular member removably and centrally mounted in the or each first aperture; wherein the or each annular member is provided with a center aperture for guiding drilling of a center hole and, with the annular member removed, the or each first aperture is for guiding drilling of a hole which will accommodate a or the pipe of said pipework.

Preferably the or each annular member is supported from a wall of a respective first aperture by at least one leg which may be broken off the template to allow the complete width of the first aperture to be drilled.

This is particularly advantageous since it is very difficult to drill a large diameter hole with a single large drill bit, firstly because of the force and energy required to remove such a volume of material and secondly because it is difficult to guide a large drill bit accurately. Thus, the annular member allows a small center hole to be accurately drilled and the full size hole also to be drilled using the same template and without any need to move the template.

According to a third aspect of the present invention there is provided a template for use in correctly positioning one or more pipes of pipework relative to a surface-mounted unit for installing said surface-mounted unit onto a mounting surface, the template including:

one or more substantially circular first apertures with an extent in its axial direction; wherein the or each first aperture is of a suitable diameter for allowing a respective pipe of said pipework, which is to be connected to said surface-mounted unit, to pass through; and when said template is mounted on said mounting surface, the limit of said extent, furthest from the mounting surface, of the or each first aperture is the same distance from the mounting surface as the end of the respective pipe is to be for connection of the respective pipe to the surface-mounted unit.

According to the present invention, there is also provided a method of installing a unit on a surface with connections to one or more pipes of pipework protruding from the surface, the method comprising:

screwing a template according to the above first aspect onto the wall by passing screws through the first apertures;

drilling one or more pipe holes in said surface using the or each first aperture to guide a respective drill bit of a diameter corresponding to the diameter of the respective first aperture;

fitting a or the pipe in the or each pipe hole; and mounting the surface-mounted unit onto said surface using at least some of the screw holes used to attach the template to the surface and connecting said unit to the or each pipe.

In addition, the invention also provides a method of installing a unit on a surface, with connections to one or more pipes of pipework protruding from the surface, the method comprising:

mounting a template according to the second above aspect onto said surface;

drilling one or more center holes in said surface using the or each annular member to guide a respective drill bit of a diameter corresponding to the internal diameter of the respective annular member;

removing the one or more annular members from the template;

drilling one or more pipe holes in the surface using the or each first aperture and a respective center hole to guide a respective drill bit of a diameter corresponding to the diameter of the respective first aperture;

fitting a pipe of said pipework within the or each pipe hole; and mounting the surface-mounted unit onto said surface and connecting the one or more pipes to the surface-mounted unit.

Further, the invention also provides a method of installing a unit on a surface, with connections to one or more pipes of pipework protruding from the surface, the method comprising:

mounting a template according to the third above aspect on said surface;

providing said one or more pipes projecting from said surface, the or each pipe being at a position corresponding to a respective first aperture of said template;

limiting the distance the or each pipe projects from said surface to the same extent as the furthest extent from the mounting surface of the corresponding first aperture; and mounting the surface-mounted unit onto the one or more pipes.

BRIEF DESCRIPTION OF THE DRAWINGS

The present invention will be more clearly understood from the following description, given by way of example only, with reference to the accompanying drawings in which.

DETAILED DESCRIPTION OF THE INVENTION

Figure 1:
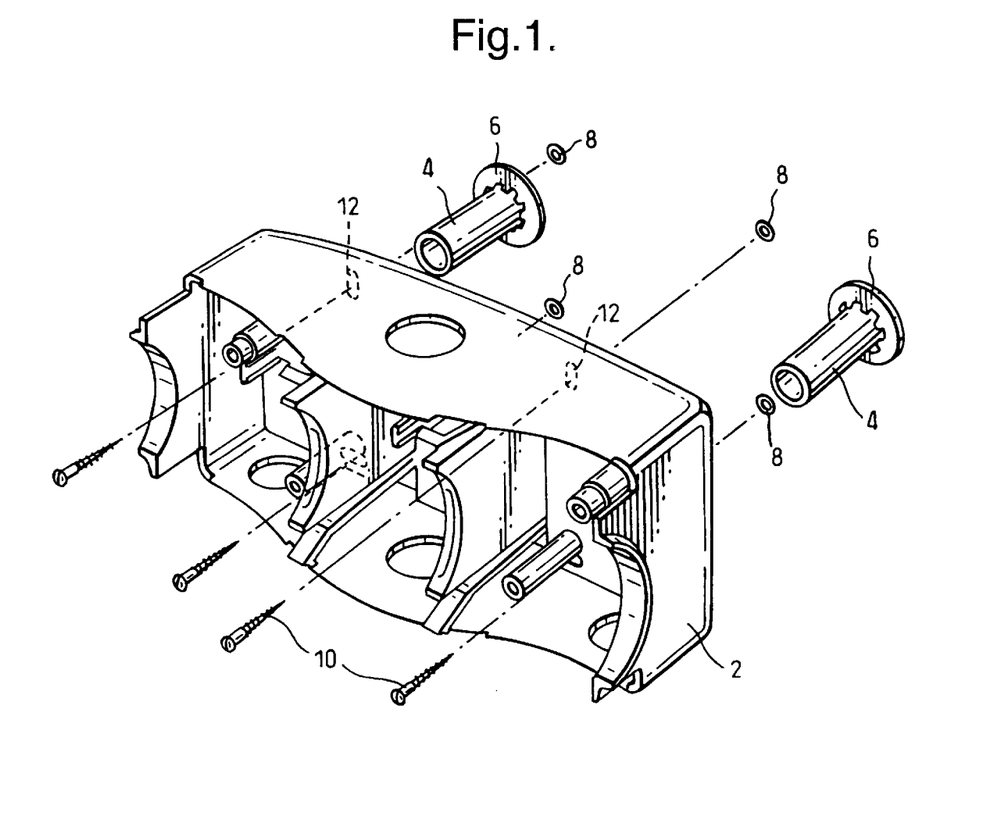
FIGS. 1 and 2 illustrate how a unit may be mounted to a wall for attachment to two pipes.

As is illustrated in FIG. 1, it is sometimes necessary to mount a unit on a wall, such that it receives pipework from the wall.

In the case of FIG. 1, the back of a shower mixing unit 2 is illustrated as receiving two water inlet pipes 4 which emerge from a wall. Clips 6 are also provided to prevent the pipes 4 from being pushed back through the wall when the shower mixing unit 2 is pushed onto them. As illustrated, the shower mixing unit 2 receives hot and cold water from the inlet pipes 4 and the resulting mixed flow of water is ducted externally, for instance via a flexible hose to a hand shower. However, it is also possible to provide an additional outlet pipe between the two inlet pipes 4. The outlet pipe may then travel behind the wall up to a shower head or to a separate outlet for a flexible hose.

Figure 2:
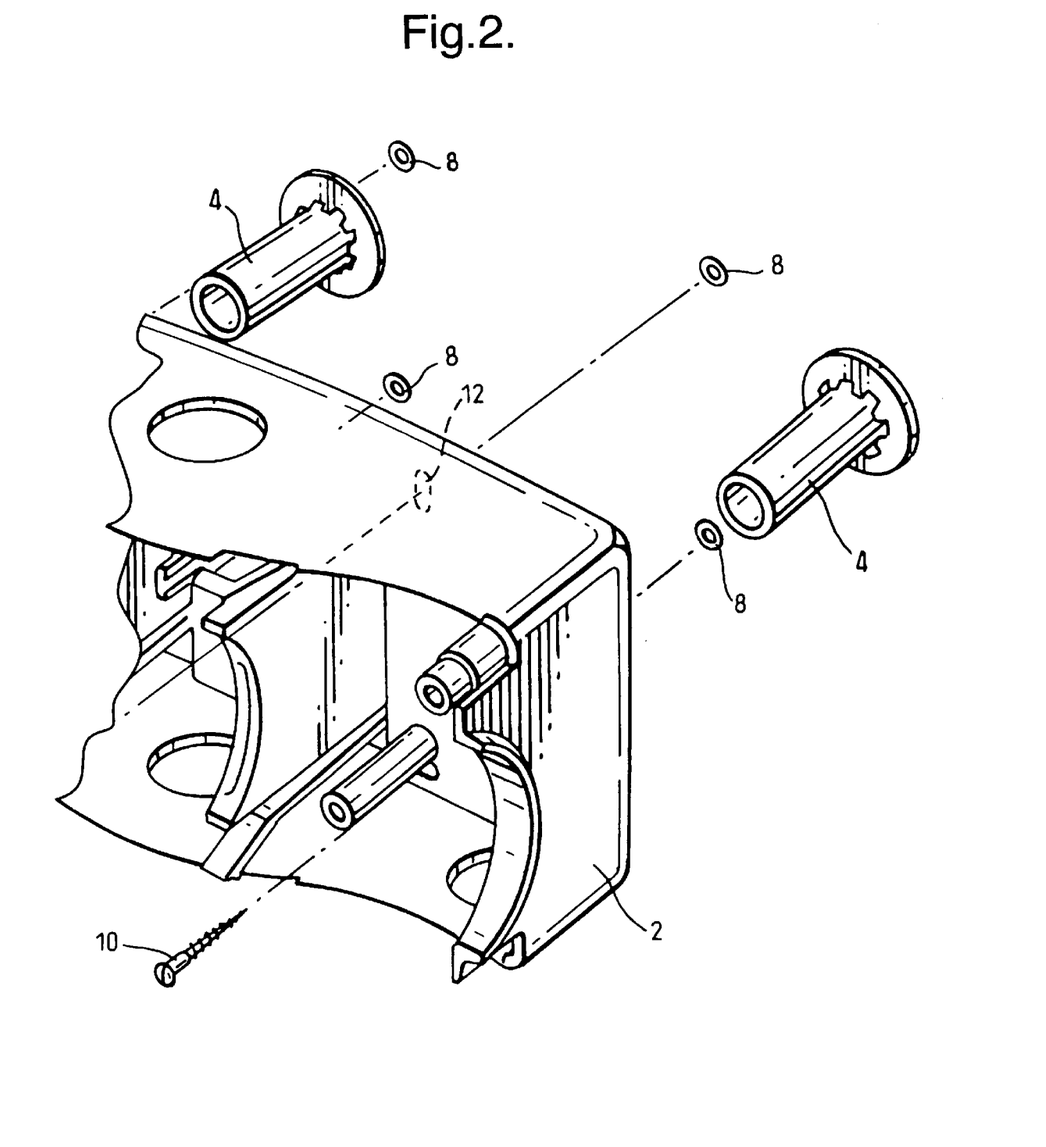

As also illustrated in FIG. 2, screw holes 8 are provided in the wall corresponding to mounting holes 12 in the back of the shower unit 2. Thus, to mount the shower unit 2 on the wall, screws 10 pass through mounting holes 12 and are screwed into holes 8.

Figure 3:
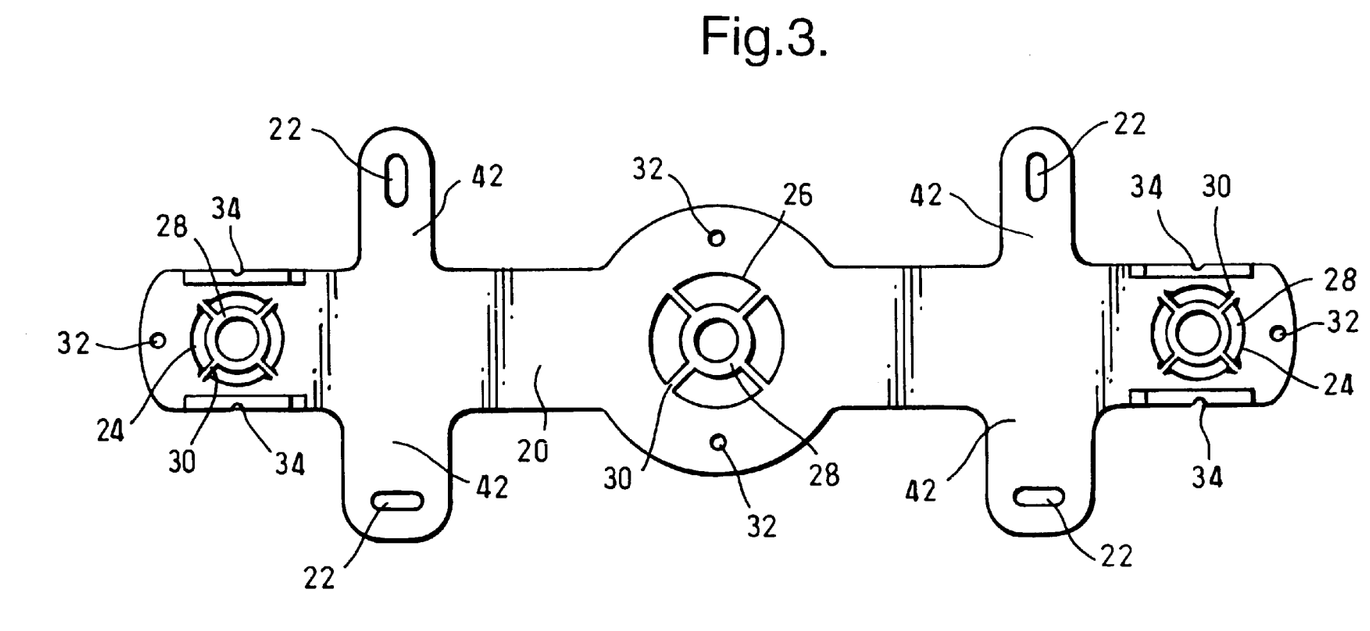
FIG. 3 illustrates a front plan view of a template according to a first embodiment of the present invention.

In order to position the screw holes 8 and holes for the inlet pipes 4 and outlet pipe correctly, there is provided a first embodiment of a template 20, illustrated in plan view in FIG. 3.

The template is shown as a generally flat, long thin article. The rear surface of the template is preferably generally flat to allow it to be placed flush against a flat mounting surface.

The template 20 is relatively rigid and tough. It may be moulded and is preferably made from a plastic, for instance a polymer, such as ABS, or made from an alloy, such as diecast zinc. As may be seen from FIG. 4, the template 20 has some thickness to it. This need only be of the order of 2 or 3 mm, for example 2.5 mm, but as will be appreciated from the following, a thicker template, or at least thicker portions, will provide improved guidance for tools.

Figure 5:
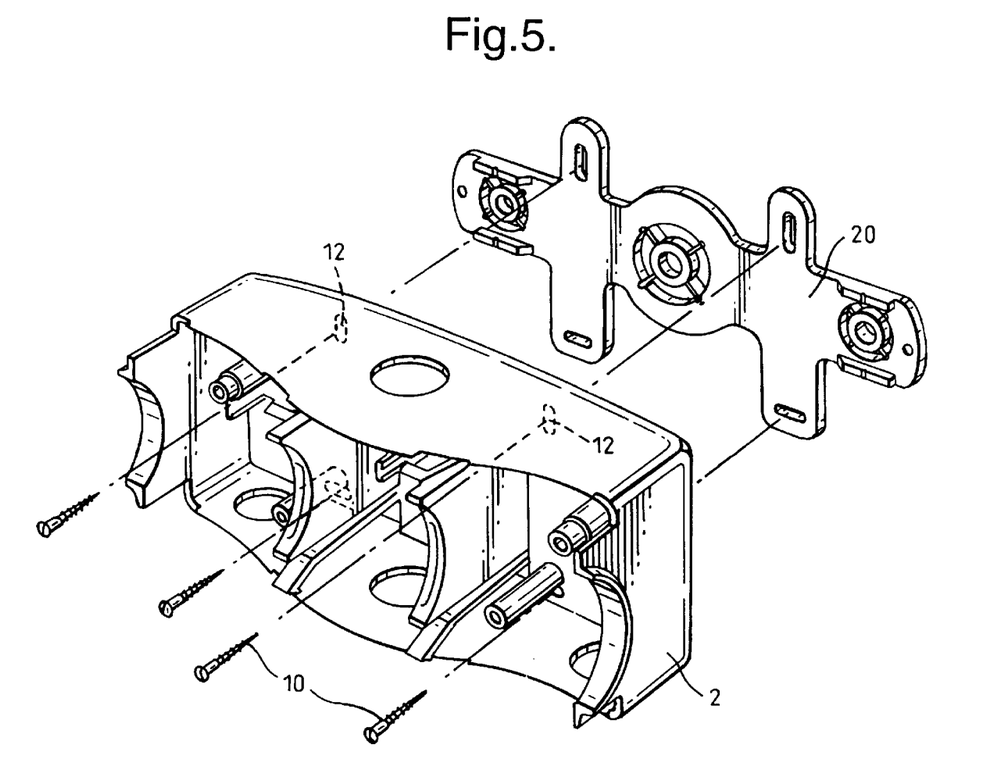
FIG. 5 illustrates the template of FIG. 3 in relation to a corresponding wall mounted unit.

The template 20 is provided with mounting apertures 22 which correspond in size and shape to the mounting holes 12 in the back of the shower mixing unit 2. This is also illustrated in FIG. 5. In this embodiment these moulding apertures 22 are provided in arms 42 which extend out from the main, planar body of the template in the same plane.

The template 20 is also provided with inlet apertures 24 and an outlet aperture 26. These correspond in size to the inlet pipes 4 and any outlet pipe which are to be connected to the mixing unit 2. Furthermore, the positional relationship between the inlet/outlet apertures 24,26 and the mounting apertures 22 is identical to that between the mounting holes 12 and the pipe receiving parts of the mixing unit 2.

As illustrated in the Figures, annular rings 28 are provided within each of the inlet and outlet apertures and are mounted to the walls of the apertures 24,26 by means of legs 30. The function of these rings will be described below.

The template 20 is used by holding it against a wall to mark the positions of the screw holes 8 and pipework (that is the inlet pipes 4 and any outlet pipe). Preferably, before dealing with the pipework, the template 20 is first screwed to the wall by means of the mounting apertures 22. In this way, since the apertures 22 correspond to the holes 12 in the back of the shower mixing unit 2, if the pipes fit through apertures 24 and 26, they must necessarily fit correctly into the shower mixing unit 2. In fact, the apertures 22 may be smaller than the holes 12 and still have this effect.

With the template 20 screwed in place, it is possible to mark the positions of the apertures 24 and 26. In this respect, the annular rings 28 also provide a stencil by which to draw or etch a smaller concentric circle and thereby mark the position of a smaller center hole. The template may also be used to mark the center lines of the apertures 24 and 26. In this respect, small holes 32 and grooves 34 are provided around the template on these center lines.

The template 20 is preferably used as a physical guide for drill bits. In particular, with the template screwed in place on a wall, the annular rings 28 may be used to guide a drill bit into the wall and thereby drill small center holes for the pipework. With the center holes so drilled, the annular rings 28 and legs 30 may be broken out of their corresponding apertures 24 and 26, such that the apertures 24 and 26 may guide larger respective drill bits into the wall so as to drill holes of the correct diameter for the pipework.

The provision of the annular rings is particularly advantageous since it is very difficult to drill a large diameter hole with a single large drill bit, firstly because of the force and energy required to remove such a volume of material and secondly because it is difficult to guide a large drill bit accurately. Thus, the annular member allows a small center hole to be accurately drilled and the full size hole also to be drilled using the same template and without any need to move the template.

The template may now be removed, but, alternatively, it may remain in place while the pipework itself is fitted and any finishing, such as plastering or tiling, around the pipework is completed. The template may also be permanently left in place. In this respect, it is preferable that the wall mounted unit, for instance illustrated in FIG. 5, is provided with a suitably recessed back such that it can be mounted over the template 20, whilst being flush with the wall.

Figure 4:
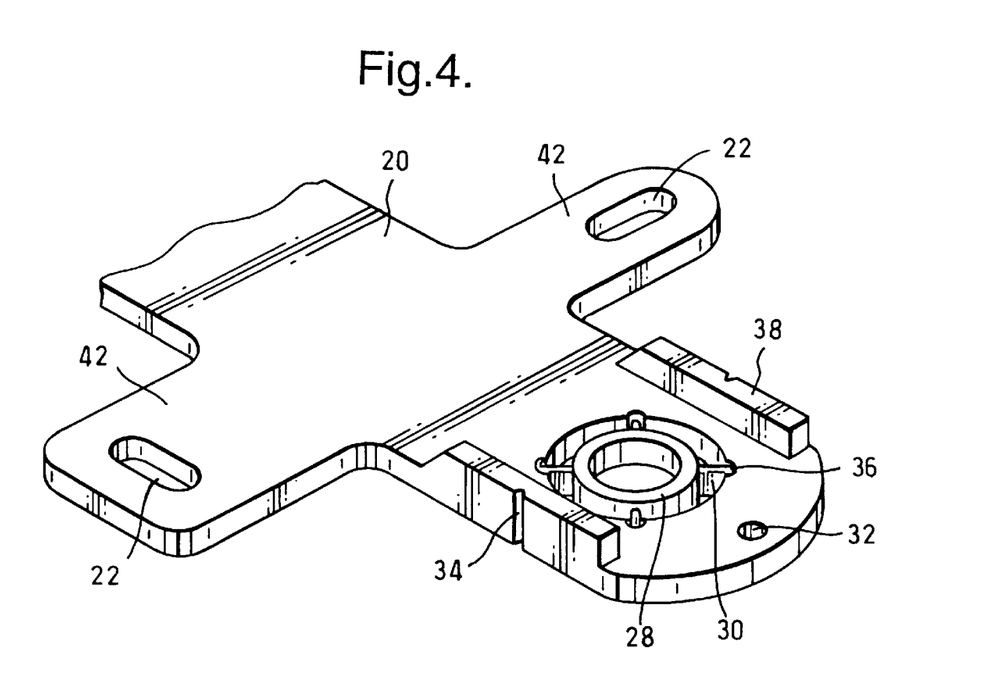
FIG. 4 illustrates a perspective view of one end of the template of FIG. 3.

To ensure that the annular rings 28 and legs 30 break away from the template 20 correctly, the legs preferably have a thinner cross-section where they meet the walls of the apertures 24 and 26. Furthermore, as illustrated in FIG. 4, the legs preferably meet the walls of the apertures 24 and 26 inside slight indented portions 36 such that if any small part of leg 30 remains attached to the template 20, it lies outside the diameter of its corresponding aperture 24 or 26.

As illustrated, each annular ring 28 has four legs 30. However, clearly, any number of legs, including only one leg, could be used to mount the annular rings 28 in their apertures 24,26. Indeed, it would also be possible to mount the annular rings 28 by means of thin continuous or partially continuous webs.

When positioning the template on a wall, it is possible to use the holes 32 and grooves 34 to position accurately the template with respect to previously marked positions. In particular, if one or more center lines are previously marked on the wall, by means of the holes 32 and grooves 34, it is easy to see when the template 20 is correctly positioned on the center lines.

The template 20 also provides another feature allowing correct positioning. This is the provision of ledges 38 around the edge of the template 20. With the template held against a wall, the ledges 38 project away from the wall and allow a spirit level to be rested on their surfaces. In this way, a spirit level may be used to ensure squared positioning of the template. The ledges do not need to be wide, for instance extending only 2 mm beyond the edge of the main, planar portion of the template.

Figure 6:
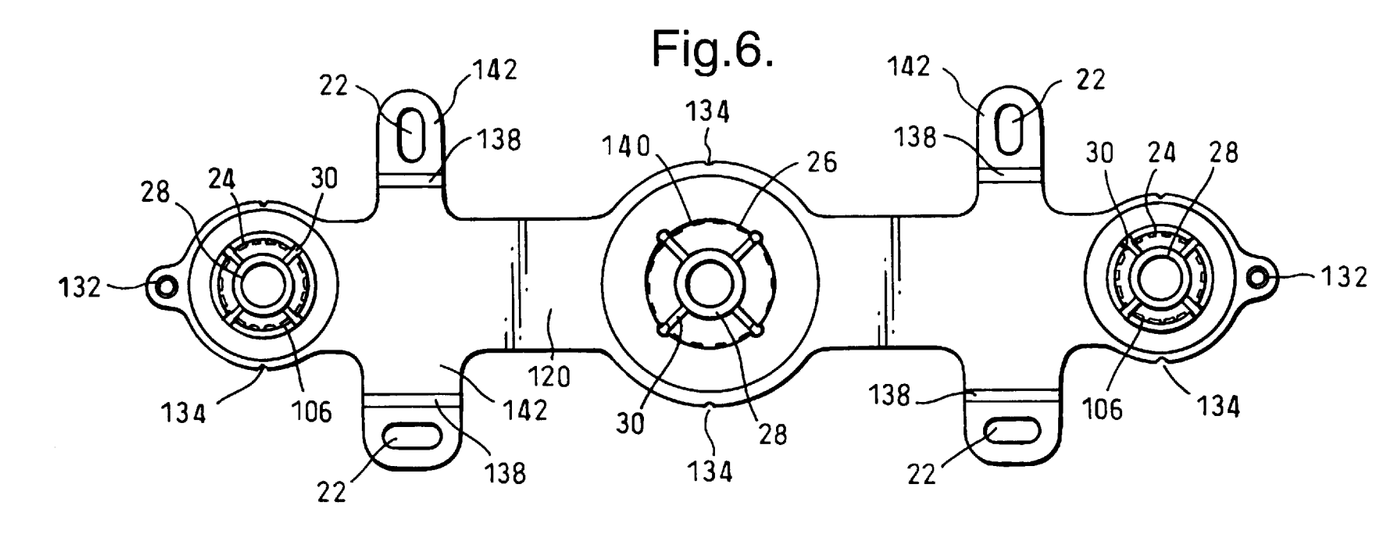
FIG. 6 illustrates a front plan view of a template according to a second embodiment of the present invention.

A second embodiment of a template 120 is illustrated in FIG. 6. This embodiment is intended for the same arrangement of pipes and screws as the first embodiment. Those portions of the template 120 which are identical or similar to portions in the first embodiment have been given the same reference numbers.

The principle differences between the template of the second embodiment and the template of the first embodiment are in the apertures 24,26 and the positions of the ledges 138.

The apertures 24,26 are positioned identically in these first two embodiments. However, in the second embodiment the width of the template around the apertures is increased. This is so that each aperture can accommodate a pipe retaining clip 106,140. These clips are preferably similar to the clips 6 shown in FIGS. 1 and 2, for instance as shown in greater detail in FIGS. 7a and 7b.

Figure 7:
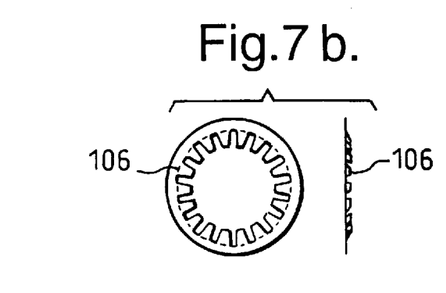
FIGS. 7a and 7b each illustrate a front and side view of a clip for retaining a pipe in position.

FIG. 7a shows the front and side views of a clip 140 to be provided in the outlet aperture 26. FIG. 7b shows the front and side views of a clip 106 to be provided in the two inlet apertures 24. As can be seen, the clips comprise annular rings, the inner edges of which are serrated and bent to one side. A pipe which passes through the clip from behind bends the serrated teeth further out. However, if an attempt is made to withdraw the pipe, this tends to pull the teeth backwards towards a flattened state. This reduces the internal diameter of the annular ring causing a clamping action on the pipe.

The template 120 can be provided with recesses in its rear so that clips already fitted around pipes through the wall can fit into the template. In this way the rear of the template can be located flush against the wall with the clips already in place. In this case, the clips may themselves be housed in annular rings for ease of handling and application. Alternatively, the clips 106,140 can be moulded into the walls of the apertures 24,26 themselves. In this way, the template 120 itself holds the pipes in place and, as mentioned before can be left permanently in place.

If the pipe holes corresponding to the full size of the apertures 24,26 are to be drilled with the template still attached to the wall, then either the clips 106,140 should not be present, for example they could be removed from the template, or the clips 106,140 should be rotatable within the template. In the latter case, it is possible for the clips to rotate with the drill bits and not to be damaged by the drilling.

If the clips 106,140 are, for whatever reason, to be rotatable within the template, they can still be sealed into the template. Alternatively, the clips can be provided in annular plastic casings which allow the clips to rotate within them and these casings can be inserted into recesses in the back of the template.

Another major difference between the templates of the first and second embodiments is that, in the second embodiment, the ledges 138 are provided in the arms 142 on the template body, in which the mounting apertures 22 are provided.

Further, it can be seen that the small holes 32 of the template 20 of the first embodiment are not provided around the inlet pipe aperture in the template 120 of the second embodiment. Instead, the template of the second embodiment is provided with grooves 134 above and below each of the pipe apertures. These fulfil the same function as the grooves 34 in the first embodiment.

It will be readily apparent that many of the features of the second embodiment can be applied to the template of the first embodiment and vice versa. For instance, the ledges 138 of the second embodiment could be provided instead of the ledges 38 of the first embodiment. Alternatively the upper arms 142 of the template 120 of the second embodiment could be provided with the ledges 138, whilst ledges 38 as shown in the first embodiment could be provided below the inlet pipe apertures 24. Other positions are also possible for the ledges. It may also be desirable to have ledges above and/or below the aperture for the outlet pipe.

It may be that, for some installations, the shower unit will be fed from pipes which will come through the ceiling from above, close to one wall, or from a wall close to a corner with another wall or another obstruction. In this case it may be necessary for the installer to maintain a minimum distance between the ceiling or wall through which the pipes are to exit and the other wall or other obstruction. Therefore, the template 20,120 can be provided with longitudinal extensions to some or all of the arms 42,142. These extensions would, for example, be in the same plane and directions as the arms, having the same widths, but would extend further beyond the mounting apertures 22,122 than is currently shown.

When such a template is placed up against the point where the ceiling or wall meets the obstruction, these extensions ensure that the holes for the various pipes are not placed too close to the obstruction. These extensions do not need to be part of the various legs 42,142. Instead they could extend from other parts of the template, for instance from between the arms 42,142 and the outlet pipe aperture 26, from beyond the inlet pipe apertures 24 or even from a position above or below the inlet pipe apertures. It may be that such extensions would get in the way when the installer does not have to or no longer needs to worry about the distance of the pipes from an obstruction. In this case, especially if the template is to be left permanently in place, the extensions could have weakened portions which allow them to be readily snapped off from the rest of the template.

A third embodiment of a template 220 is shown in FIGS. 8 to 13.

Figure 8:
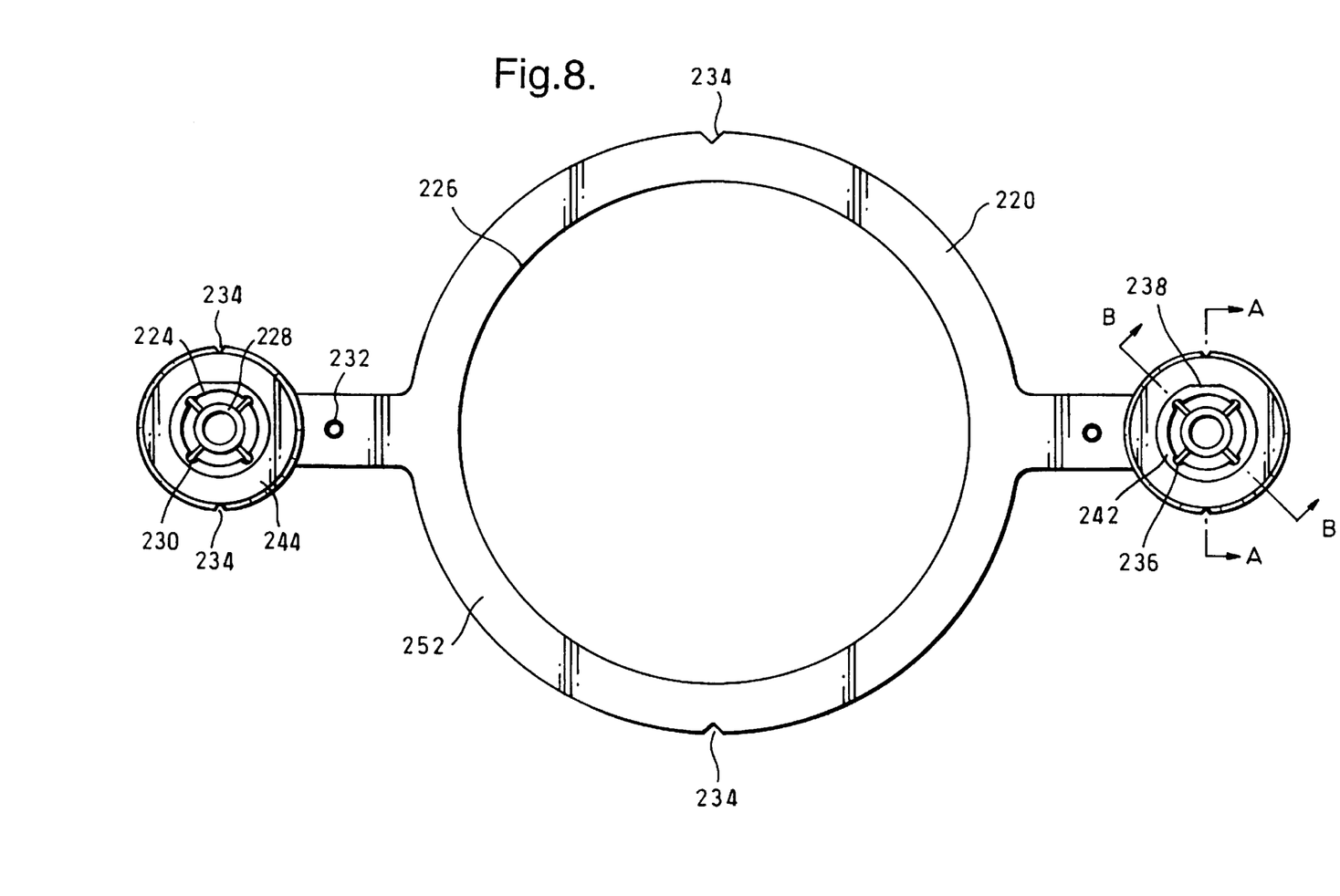
FIG. 8 illustrates a front plan view of a template according to a third embodiment of the present invention.

The template 220 is intended for use with a different type of shower unit. A back portion of the shower wall unit, for use with this embodiment is intended to be fixed to the wall at positions within a circular portion 252 of the template 220. It is intended that it should be a close fit between the back portion of the shower wall unit and the circular portion 252, with at least a part of the back portion of the shower wall unit having a circular shape corresponding to the inner diameter of the circular portion 252. In this way, when the back portion is already mounted on the wall, the template 220 may be physically held in place so as to ensure correct alignment of the pipework. Alternatively, with the pipework in place and the template 220 mounted around the pipework, the template 220 may physically hold the back portion in place while it is mounted. Of course, other embodiments are possible for non-circular back portions and these have the advantage of additionally fixing the orientation of the template relative to the back portion. Of course, it is also not necessary, for the shape of the template 220 to conform entirely with the back portion, but only for parts of it to contact the back portion in a manner so as to hold the template 220 and back portion relative to one another against movement of at least one type.

In the embodiment shown in FIG. 8, there are no mounting apertures specifically intended to correspond in size and shape to any mounting holes in the back of the shower wall unit. There are small holes 232 which can be used to attach the template to a wall. It is possible for these to correspond to screw holes for attaching parts of the shower wall unit extending beyond the circular portion 252 to the wall also.

The template 220 is provided with inlet pipe apertures 224 which are similar to the inlet pipe apertures 24 of the first and second embodiments. These inlet pipe apertures are surrounded by inlet pipe portions 244. As before, these apertures 224 correspond in size and relative positions to the inlet pipes 4 to be connected to the mixing unit. Again, as before, annular rings 228 are provided within both of the inlet apertures 224. The annular rings 228 are also attached to the walls of the apertures 224 by means of legs 230. The function of these rings 228 is identical to the function of the rings 228 in the first and second embodiments. As before, there are also slight indented portions 336 which correspond to the indented portions 36 of the first two embodiments and work in an identical manner.

Again, although the annular rings 228 are shown having four legs 230, clearly, any number of legs, including only one leg, could be used to secure the annular rings 228 in the apertures 224, or continuous or only partially continuous thin webs can be used instead.

Above and below each aperture 224 and above and below the circular portion 252 there are grooves 234 to help in positioning the template 220 accurately with respect to previously marked positions or to help in marking those positions. The small holes 232 can also be used to help mark the position on the wall where the template is to be mounted.

Figure 9:
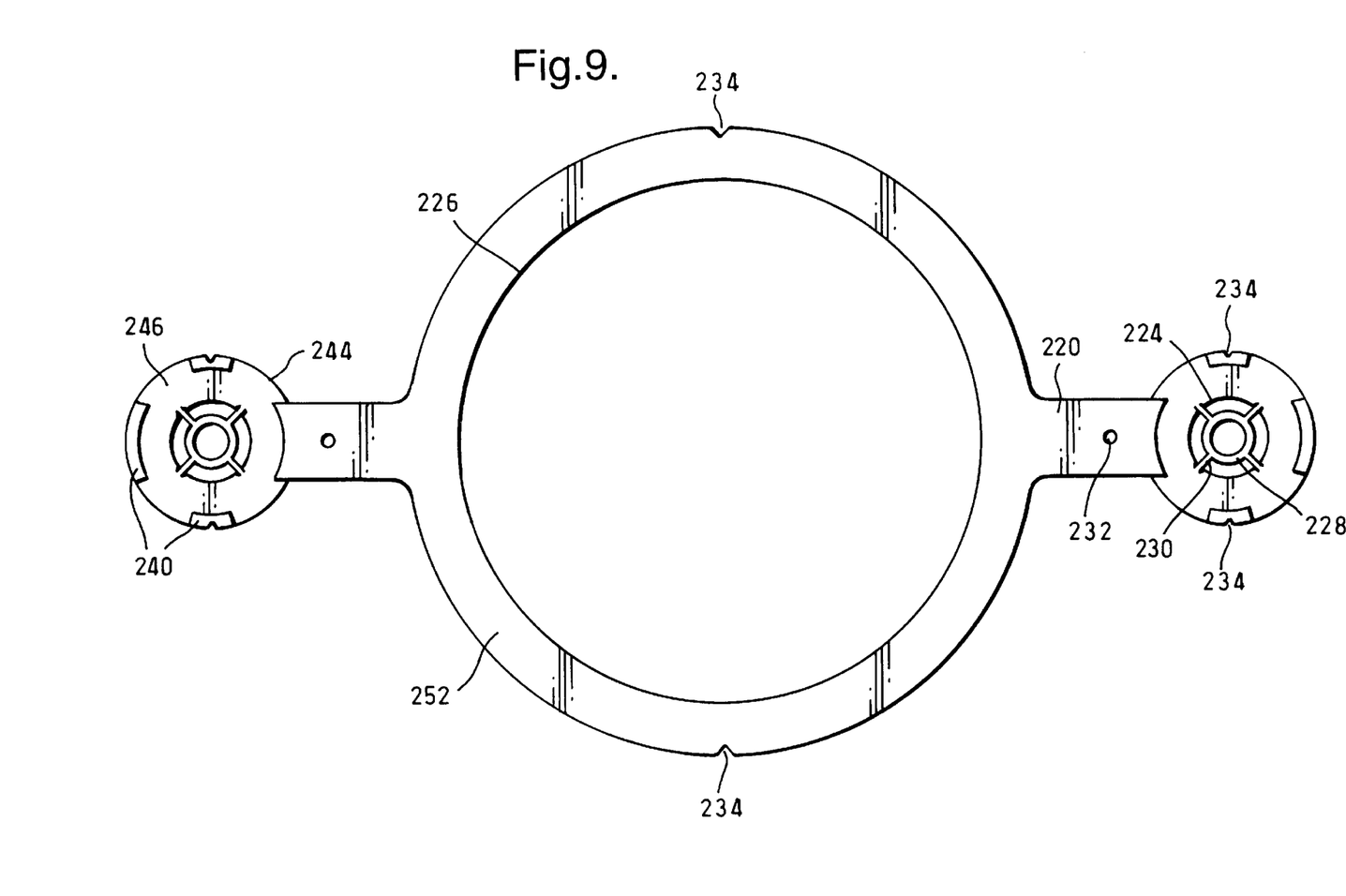
FIG. 9 illustrates a rear plan view of the template of FIG. 8.
Figure 10:
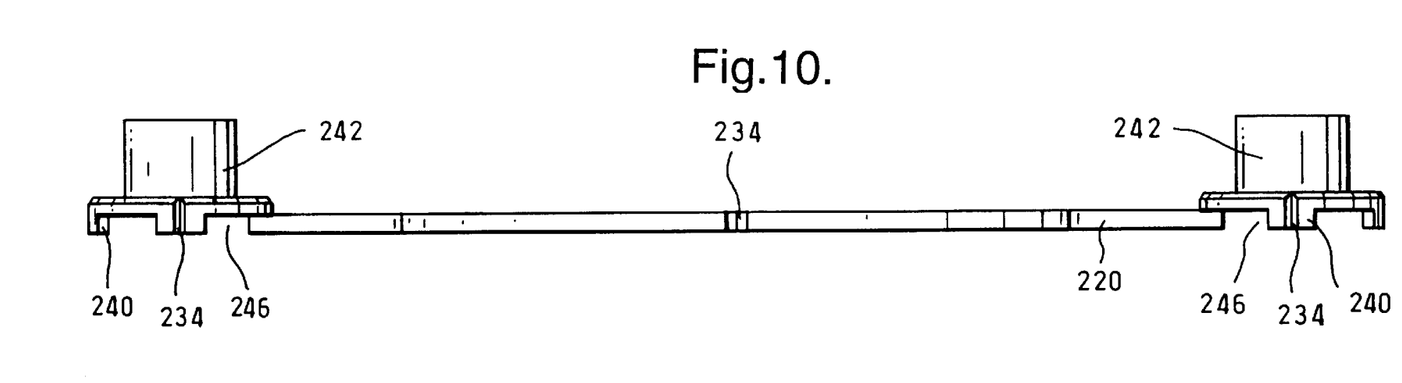
FIG. 10 illustrates a side elevation of the template of FIG. 8.
Figure 11:
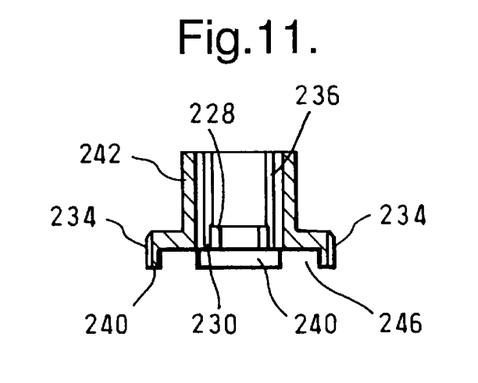
FIG. 11 illustrates a cross-section through line A—A of FIG. 8.
Figure 12:
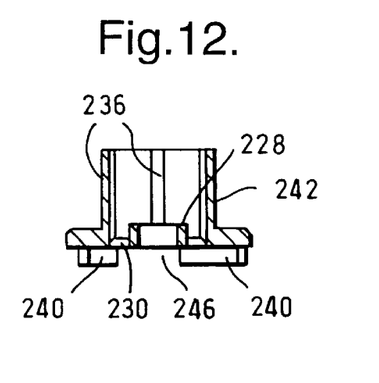
FIG. 12 illustrates a cross-section through line B—B of FIG. 8.

FIG. 9 shows a rear view of the template of FIG. 8. FIG. 10 shows a side view of the template of FIG. 8. FIGS. 11 and 12 respectively show cross-sections taken through lines A—A and B—B of FIG. 8.

As can be seen in FIGS. 9 to 12, at the rear of the inlet pipe portions 244 there are recesses 246 which are partially surrounded by recess walls 240. These recesses 246 allow the positioning of the pipe retaining clips 6,106,140 which are described previously. As before, these recesses 246 can accommodate the clips alone or the clips mounted in annular casings. Alternatively, the clips can be sealed within the template 220 itself such that there would be no need for these recesses 246. Of course, it is also possible to provide a similar template which, like that of the first embodiment does not include clips or recesses for such clips.

One very useful feature of the template 220 is the extensions 242 to the pipe guides. These can be seen clearly in FIGS. 10 to 12. These extensions 242 extend away from the rear of the template. They are designed to be the right length such that they provide a guide as to how far a protruding pipe should extend, for example 20 mm from the wall. Shower wall units of the type with which this template 220 is intended to be used are designed so that the inlet pipes fit into seals in the back of the shower unit, which automatically seal with the pipes. There are minimum, maximum and ideal lengths of pipe which can be used with such units. The extensions 242 can be used to mark where to cut the pipes, to guide physically the cutting of the pipes or otherwise to position the pipe ends, to ensure the ideal pipe length is present. This can allow for better designs of showers units.

The template can be intended as a permanent or integral part of the shower to be left permanently on the wall. If that is the case then the outside diameter of the extensions 242 are correct to seal in the rear of the shower main body which is to be used. There should also be a seal between the inlet pipe hole 224 and an inlet pipe within it. The rear of the shower mixing unit will be recessed to fit closely onto the template.

If there are to be seals between the inlet pipe extensions 242 and inlet pipes, then the indented portions 236 should not extend to the tops of the extensions 242.

Alternatively and preferably, where the template is to remain permanently in place, the extensions 242 should be formed so as to be easily broken away from the rest of the template. For instance, the extensions may be connected to the template by a thinner weaker portion at their bases or may be formed merely as separate legs of the same length, preferably with a ring at the end attached to each of the legs.

It may also be possible to provide the extensions 242 with two or more possible lengths. According to the shower unit model or other factors, the user could use the original length or cut or break the extensions to a shorter length as needed. The template could be removed or could remain, as above.

The top edges of the extensions 242 are shown with flattened portions 238 for locating a spirit level to achieve squared positioning of the template, to be used in the same way as the ledges 38,138 described previously. However the flattened portions are not necessary and, equally preferably, a spirit level could rest on a single point of contact on both extensions 242.

Figure 13:
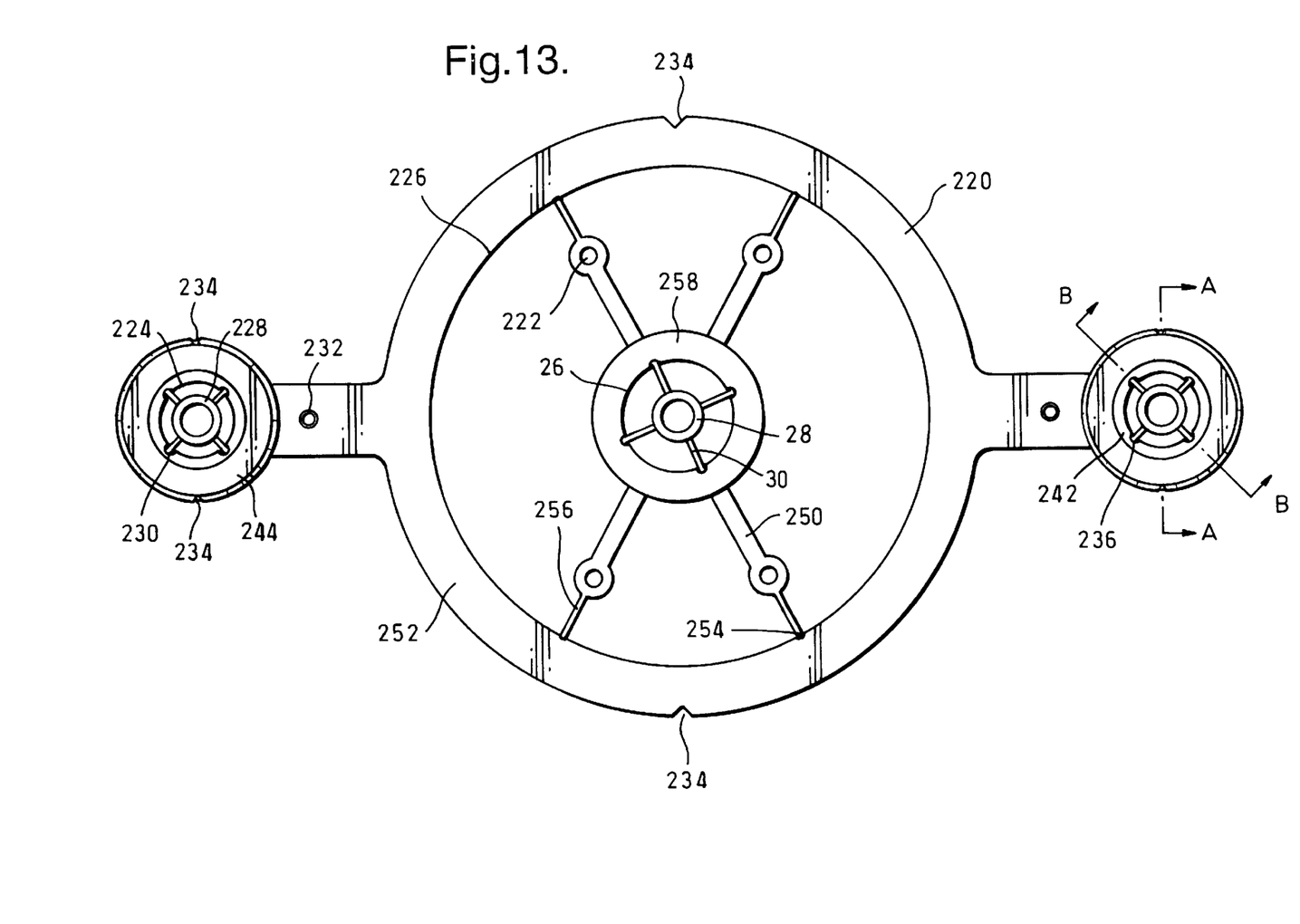
FIG. 13 illustrates a front plan view of a modified version of the template of FIG. 8.

FIG. 13 shows a modified version of the template 220 of the third embodiment. The differences between this version and the previously described version are within the circular portion 252 where there is a central portion drilling guide 250, and in the lack of the flattened portions 238 on the inlet pipe extensions 242.

The central portion drilling guide 250 consists of four center legs extending towards the center of the circular aperture 226. In the center of the aperture 226 the four center legs meet an output pipe drilling guide 258. In the center of this output pipe drilling guide there is an output pipe aperture 26 having an annular ring 28 and legs 30. The output pipe drilling guide 258 is used in an identical fashion to the output pipe aperture 26,126 and associated annular ring 28 in the earlier embodiments. It is used to drill a hole for positioning the output pipe.

The four center legs each has a unit mount position drill guide 222. The positions of these further drill guides 222 correspond to the positions of screws needed for mounting the shower wall unit on the wall. As with the mounting apertures 22 of the first two embodiments, these guides 222 can be used for screwing the template to the wall. Once it is no longer necessary to attach the template to the wall using these guides 252, the legs 256 can be snapped at the indented portions 254 in a similar manner to the removal of the legs 30 from the previous embodiments.

The output pipe drilling guide 258 may have an extension on it similar to the drilling guide extensions 242 on the inlet pipe guides.

The central portion drilling guide 250 may be provided without the output pipe drilling guide 258 or without the mount position drill guides 222.

The center aperture 226 of the template 220 shown in FIGS. 8 or 13, could be provided with a rim extending from the main body of the template 220. If the template is to remain on the wall then this rim could be used to provide protection to the inside portion of the wall unit. Another portion of the wall unit may be placed on the circular portion 228 outside the rim.

Each of the various described examples of templates can be used to start off the installation of the shower. Alternatively, it can be used once the positions of one or both inlet pipes have been determined or when the body unit only has been positioned. If the pipes are already present, the template can be mounted, giving the positioning for the main body unit. If the main body unit or its back-plate only has been mounted, the template can be mounted to determine the positions of the pipes.

For any embodiment, the advantage of having removable pipe grips (whether or not they are in annular casings) is that once the pipes have been fitted, the grips can be mounted onto them to keep them in place and the template can be mounted and removed freely. If the grips are integral with the template, then it would be extremely difficult to remove the template once it has been fitted onto the pipes. This might be a feature of a template which is intended for permanent fixing to the wall. The template can also be useful for pushing the grips onto the pipes if the grips are not integral with the template.

As will be readily apparent, various features of the three embodiments can be changed or interchanged. For instance, the extensions of the drill guides of the third embodiment for deciding where to cut the pipes could be used in either of the first two embodiments. The pipe grip recess 246 of the third embodiment could be used in either of the first two embodiments. The flattened edge 238 which is only present on one side of the input pipe apertures in the third embodiment could be present on both sides, as shown in the first two embodiments. The third embodiment could be provided with the arms 42,142 and mounting apertures 22 of the second embodiment. The first and third embodiments could be provided with the positioning extensions for positioning the template a sufficient distance from an obstruction, as described in connection with the second embodiment. Various other possibilities would be readily apparent.

Finally, it should be noted that, although the present invention has been described in relation to two particular arrangements of pipework and mounting screws, it is not limited to these particular arrangements. The templates can be provided with apertures for one, two, three, four or more pipes. They can also be provided with a plurality of apertures which can be used in different combinations according to which model of shower or other unit is being installed.

Furthermore, although reference has been made to attaching the template to a wall, the term wall is intended in a broad sense and does not exclude floors, ceilings and the like. Similarly, although the invention has been described in relation to pipes carrying water for a shower, it could be used for other plumbing, for instance for baths, sinks or lavatories where a mounted unit or outflow is needed. Further the term pipe is intended to cover other generally circular cross-section members, for instance for carrying gas, electrical or other cables or optical fibres.

We claim:

1. A template for use in correctly positioning at least one of pipework relative to a surface-mounted unit for installing said surface-mounted unit onto a mounting surface, the template comprising:

at least one first aperture for guiding at least one drill at a desired position of a pipe of said pipework in said mounting surface, wherein said at least one first aperture has a center and diameter;

second apertures for positioning screw holes in the mounting surface, for screwing the template to said mounting surface, said second apertures being smaller than said at least one first aperture; and an annular member mounted centrally within said at least one first aperture, said at least one annular member defining a center aperture for guiding drilling of a center hole; wherein the second apertures are spaced and dimensioned such that the surface-mounted unit may be mounted on the mounting surface using said screw holes at positions corresponding to the second apertures and be correctly aligned with said pipework positioned according to the at least one first aperture; and said at least one first aperture has a wall and at least one leg extending from the wall supporting one of said annular members, said at least one leg being formed to be broken off the template to allow a drill of the same diameter as the complete width of the respective first aperture to pass through said respective first aperture.

2. A template according to claim 1, wherein said at least one leg is of reduced cross-sectional area immediately adjacent the respective wall.

3. A template according to claim 1, wherein the wall of said at least one first aperture is provided with a respective indent for said at least one leg, said at least one leg being mounted on a respective wall within a respective indent.

4. A template according to claim 1, wherein:

said at least one first aperture has an axial direction and an extent in said axial direction;

said at least one first aperture is of a suitable diameter for allowing a respective pipe of said pipework which has an end to be connected to said surface-mounted unit to pass through; and when said template is mounted on said mounting surface, the limit of said extent, furthest from the mounting surface, of said at least one first aperture is the same distance from the mounting surface as the end of the respective pipe is to be for connection of the end of said respective pipe to the surface-mounted unit.

5. A template according to claim 1, further comprising pairs of position marking points, one of each pair of position marking points being on one side of a first aperture and the other of each pair being on the other side of the respective first aperture on an extended line connecting the first of the respective pair and the center of the respective first aperture, wherein each position marking point is one of a group comprising: a positioning aperture in the template and a groove in the outer periphery of the template, which allows marking of that point on the mounting surface.

6. A template according to claim 1, wherein the template has a rear mounting surface in a plane, the template further comprising levelling portions which extend generally perpendicular to the plane of the rear mounting surface of the template for enabling the template to be correctly levelled by means of a spirit level.

7. A template according to claim 1, wherein the template has a rear mounting surface in a plane, the template having at least two first apertures and further comprising extension portions which project in a direction having a substantial component perpendicular to a line joining the centers of said two first apertures, in the plane of the rear mounting surface of the template.

8. A template according to claim 1 moulded from a plastics material.

9. A template according to claim 1 for use with a shower mixing unit.

10. In combination, a template according to claim 1, having a first aperture and at least one of a further first aperture and a second aperture; and a surface-mounted unit having pipe receiving means for one pipe of said pipework and at least one of further pipe receiving means for a further pipe and mounting holes, with the same spacings as those of the respective apertures of the template.

11. A template for use in correctly positioning at least one pipe of pipework relative to a surface-mounted unit for installing said surface-mounted unit onto a mounting surface, the template including:

at least one substantially circular first aperture having a diameter, with an annular member removably and centrally mounted in said at least one first aperture; wherein said at least one annular member has an internal diameter and is provided with a center aperture for guiding drilling of a center hole and, with the annular member removed, said at least one first aperture is for guiding drilling of at least one hole which will accommodate the at least one pipe of said pipework.

12. A template for use in correctly positioning at least one pipe of pipework relative to a surface-mounted unit for installing said surface-mounted unit onto a mounting surface, the template including:

at least one substantially circular first aperture, said at least one substantially circular first aperture having an extent in the axial direction and an annular member removably and centrally mounted therein; wherein said at least one annular member has an internal diameter and is provided with a center aperture for guiding drilling of a center hole and, with the annular member removed, said at least one first aperture is for guiding drilling of at least one hole and is of a suitable diameter for allowing a respective pipe of said pipework, which has an end to be connected to said surface-mounted unit, to pass through; and when said template is mounted on said mounting surface, the limit of said extent, furthest from the mounting surface, of said at least one first aperture is the same distance from the mounting surface as the end of the respective pipe is to be for connection of the end of the respective pipe to the surface-mounted unit.

* * * * *